F. S. Pease.
Harvester Rake.
No 5925. Patented Nov. 14, 1848.

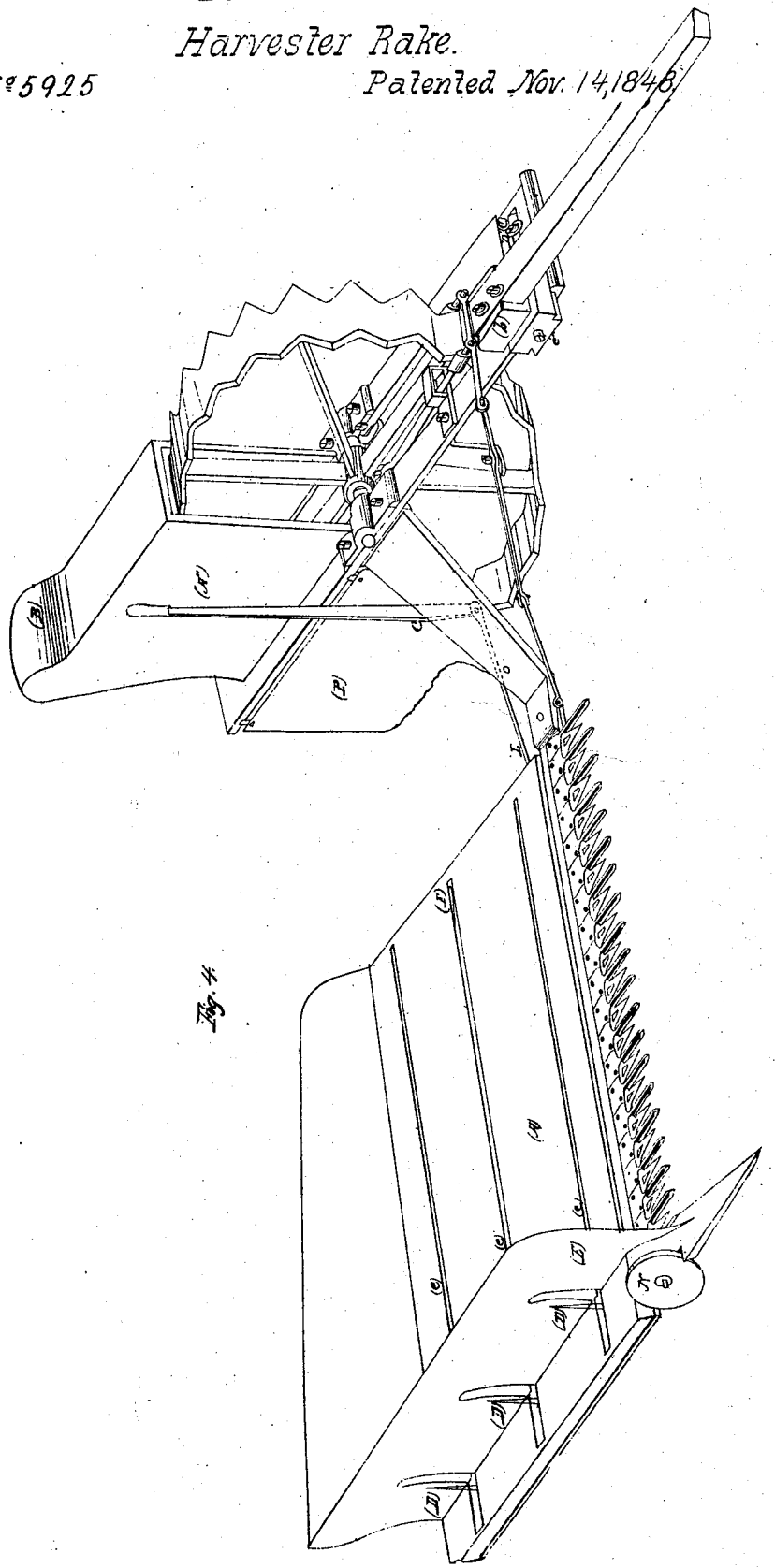

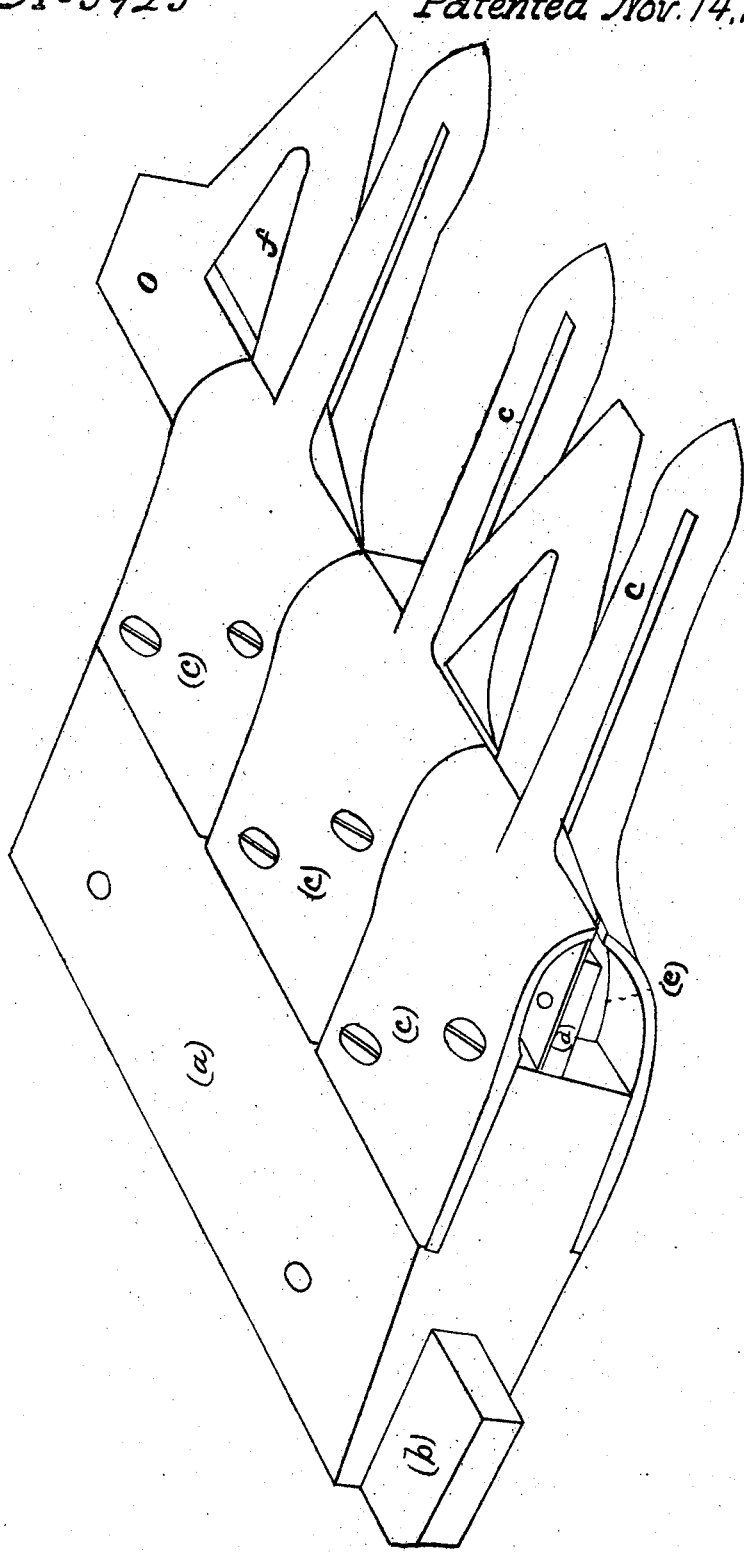

UNITED STATES PATENT OFFICE.

FRANCIS S. PEASE, OF BUFFALO, NEW YORK.

IMPROVEMENT IN HARVESTING-MACHINES.

Specification forming part of Letters Patent No. 5,925, dated November 14, 1848.

*To all whom it may concern:*

Be it known that I, FRANCIS S. PEASE, of the city of Buffalo, in the county of Erie and State of New York, have invented new and useful Improvements in Grass and Grain Cutting Machines, the nature of which inventions are as follows, viz: First, in the construction and arrangement of a raking-platform, said platform being made double, and is to be attached to a grass or grain cutting machine, for the purpose of raking grain, &c., by teeth connected with levers placed between the top and bottom of said double platform, and moved or acted upon by the hand or by the machine, by which the grain is effectually raked or moved from the platform, on which it falls when cut; second, in the construction of a wood rack-bar, with iron of proper dimensions inserted in or fastened to said bar in such a manner that it will stay and add to its strength by which a narrow wood rack-bar is made sufficiently strong, and is better adapted to the purpose required; third, in the construction of a rack-tooth, of wrought, malleable, or cast iron, sufficiently wide at the ends by which they are fastened to the rack-bar as to meet each other and make perfect joints and cover the entire width or space, both top and bottom, between each tooth on the rack-bar, and also to cover the cutter-rod, which plays or moves between both top and bottom, by which strength is added to the rack-bar, and it, as well as the cutter-bar, is protected from dirt, grass, or grain; fourth, in the construction of and arrangement of the draft in such a manner that it can be moved or varied in order to give the required draft to any machine to which it is attached.

I will now proceed to describe the construction and operation of my invention, of which the following is a full and exact description, reference being made to the annexed drawings, making part of this specification.

Figure 1:
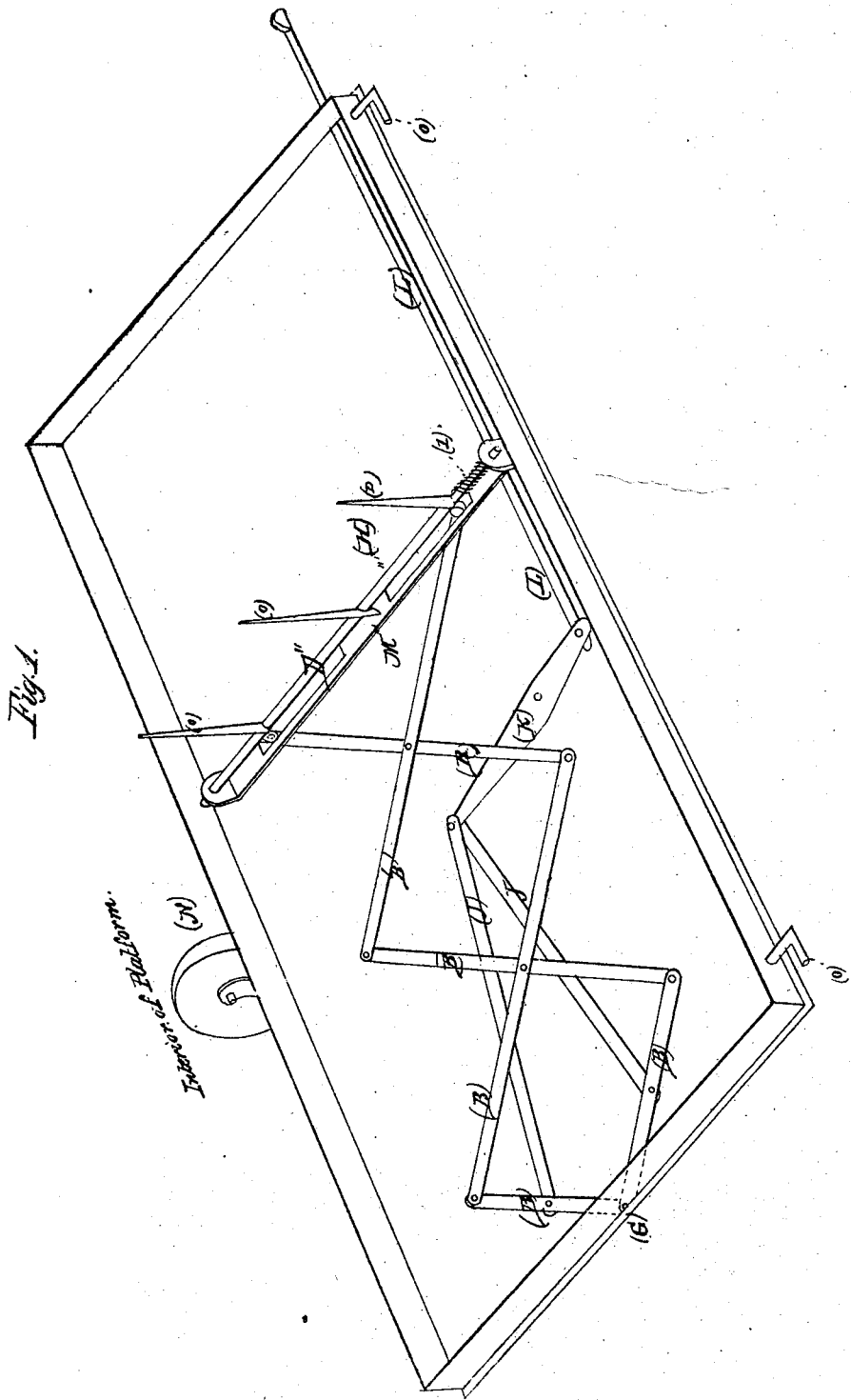

The double platform, Plate 1, Figure 1, A, can be made of wood or any metallic substance that will answer the purpose required, it being sufficiently deep that levers can be placed between the top and bottom, the length required being that of the rack-bar to which it is attached, (when required for the purpose of raking grain, &c.,) and sufficiently wide to receive the grain which falls upon or across it when cut. Through the top of said platform, and running in the direction necessary to rake off the grain, are grooves *c c c*, cut sufficiently wide and long that the rake-teeth D D D may move freely in the direction required. Said teeth projecting through said grooves are made of a length that will rake off the grain. Said teeth are connected upon the under side of the double platform (or between the two platforms) to the rod H, which is supported by the cross-head M, which is movable on the ends and connected with the levers B B.

I is a spring attached to the rod H, to which the teeth are attached, said spring allowing the teeth, with the rod, to turn and bring them in an upright position. One end of the combination of levers is attached to the bottom platform at G. To these one end of each of the levers J J is attached, the reverse ends of which are connected to the lever K, to which the rod L is attached, which extends to and beyond the outside of the said platform, and on the side nearest to the rack-bar, to which the platform is attached or fastened, by which it (the rod L) is in some measure protected and out of the way of the grain when raked off. To said rod L the power is applied (or attached) which acts the levers and moves the teeth. Said rod can be moved by the hand or by the machine.

E, Fig. 1, is a turn-off which guides the grain from the last rack-tooth to the platform. It also protects the rake-teeth, when they spring up behind it, from the falling grain, and through which holes are made for the teeth to pass.

F is a spring which fills the width of the groove, and is sufficiently strong and elastic to allow the teeth or tooth to pass, and prevents them from returning by the same grooves, but guides them under the top platform into a groove sufficiently wide and deep that it prevents them from springing into the grooves *c c c* until they are drawn back behind the turn-off E, clear of the falling grain, when they immediately rise in the grooves again.

N is a wheel attached to the back of the platform and supporting it from the ground.

O O are staples by which the platform is easily fastened or connected to the rack-bar.

The combination of levers placed between the two platforms is so arranged that by moving the two connected with the platform at G it extends or moves all the levers connected to them from or toward them, as required. The advantage of this simple arrangement of levers, aside from raking the grain, is that they occupy but little depth or space for their combined operations, by which I am enabled to place them between two platforms, which protects them both top and bottom, the thickness or depth of the platform being such that it occupies but little of the space below the rack-bar, to which it is attached, thereby giving sufficient room for the stubble to pass under it, and allowing the platform to hang sloping from the back of the rack-bar.

Its operations are as follows: The double platform being attached to a grass or grain cutting machine for the purpose of raking the grain, &c., cut by said machine, the rake-teeth being in an upright position and protected by the turn-off E from the grain that falls upon the platform when a sufficient amount has been cut and falls upon the platform, by applying power to the rod L, either by the hand moving the lever A''', Fig. 4, Plate 2, to which the rod is attached, or by moving said rod by the machine or otherwise shoving in said rod, it being connected by the levers K and J J to the levers B B'''', to which the teeth are attached, they are made to slide the length of the grooves through which they project, thereby raking or moving the grain from the turn-off E toward the machine, landing the grain on the ground between the machine and said platform, when the tooth or teeth pass the spring F and a reverse motion given to the rod L, (which draws it out.) The teeth, being prevented from returning in the grooves by the said spring, are pressed down and guided by it to the groove upon the under side of the top platform, which they travel in returning, and do not interfere with the grain that is falling on said platform and across said grooves c c c. When the teeth reach the end of the grooves between the platforms and pass the distance of the length of the teeth back of the turn-off E, which covers and protects them, as before described, they rise by the action of the spring I, and are then ready again to rake off the grain from the platform. The importance of so constructing a double platform with teeth and levers, as described, and so arranged that the teeth, after raking the grain from the platform, can be made to regain their first upright position from whence they started, is that the grain, &c., can be effectually and at once raked or moved from the platform without stopping the machine to effect it, the grain being raked off without interfering in the least with the headway of the machine to which it is attached. The advantage gained by a person who drives from the seat (Plate 2, B) and moving or working the lever A''' to rake off the grain is that, having the motion of the rake at his command, he can throw off the grain when he thinks proper, and also make allowance for the thickness or thinness of the grain.

Figure 2:
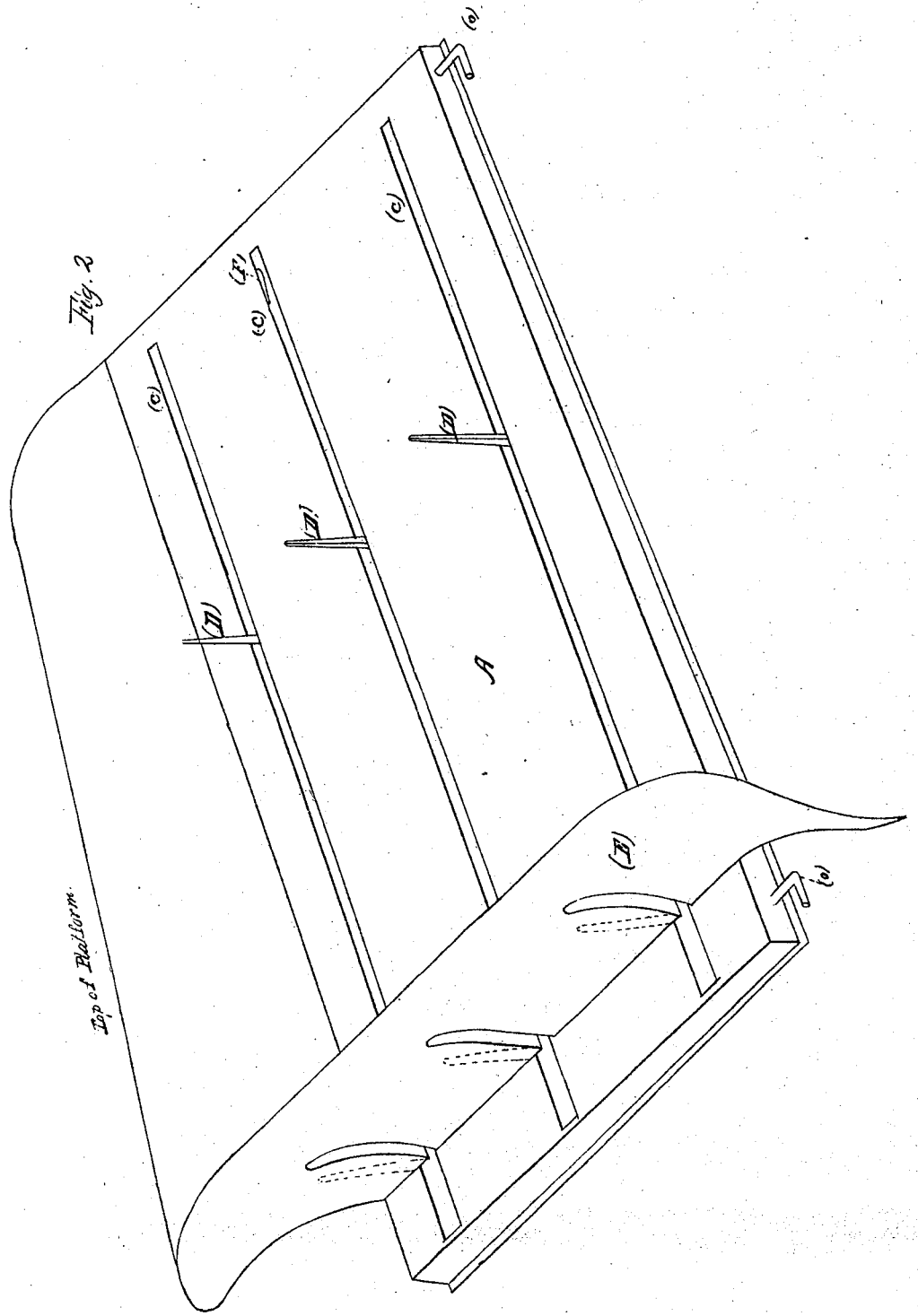

Fig. 2, Plate 1, represents the wood rack-bar. $a$ is the part constructed of wood. $b$ is the iron bar inserted in the back edge and riveted to it. The object of inserting the iron is that I may get a narrow wood rack-bar, the iron answering for the wood, and width that would otherwise be required to make it sufficiently strong for the purpose required. A narrow bar having less width for the grass or grain to fall upon it falls clear of the bar and leaves it easily, whereas in a wood bar wide enough to get the strength without the iron, it having or requiring more surface, will carry the grass or grain upon it, and thus interfere with the grass or grain to be cut.

Fig. 2, Plate 1, $e\ e\ e$ represent the rack-teeth, one end of which clasps the rack-bar and is fastened to the top and bottom of the rack-bar. They can be made either of wrought, malleable, or cast iron, malleable or cast iron being preferable, if made sufficiently strong, on account of their all being cast or made from the same pattern, and the wood rack-bar being dressed to fit any one of the said teeth, they being all alike, there is some certainty, if one should break, of another from the same pattern fitting the same place, which would be almost impossible with wrought teeth. Said teeth, as represented, are made wide at the ends which are fastened to the rack-bar, or with flanges, in such a manner that when two or three are placed together on the bar the space between any two teeth is entirely covered in the rack-bar, both top and bottom. It also covers the cutter rod or bar $d$ close to the cutter-teeth, both top and bottom, allowing said rod $d$ to pass between, thereby filling the space on the rack-bar and over the cutter-rod $d$ between any two teeth, both top and bottom. The object of filling the space in the rack-bar and covering the cutter rod or bar $d$ both top and bottom is that said rod may be protected and kept free from dirt, grass, or grain, which would otherwise soon fill in and clog it. The cutter-rod $d$ slides and rests upon a piece of the rack-tooth, which is raised from the bottom in the inside of each tooth. Rack-teeth made as described add strength to the rack-bar to which they are fastened, and protect it at the bottom from the stones, dirt, &c., and form, when placed together, a smooth surface on the top and bottom of the bar.

Figure 3:
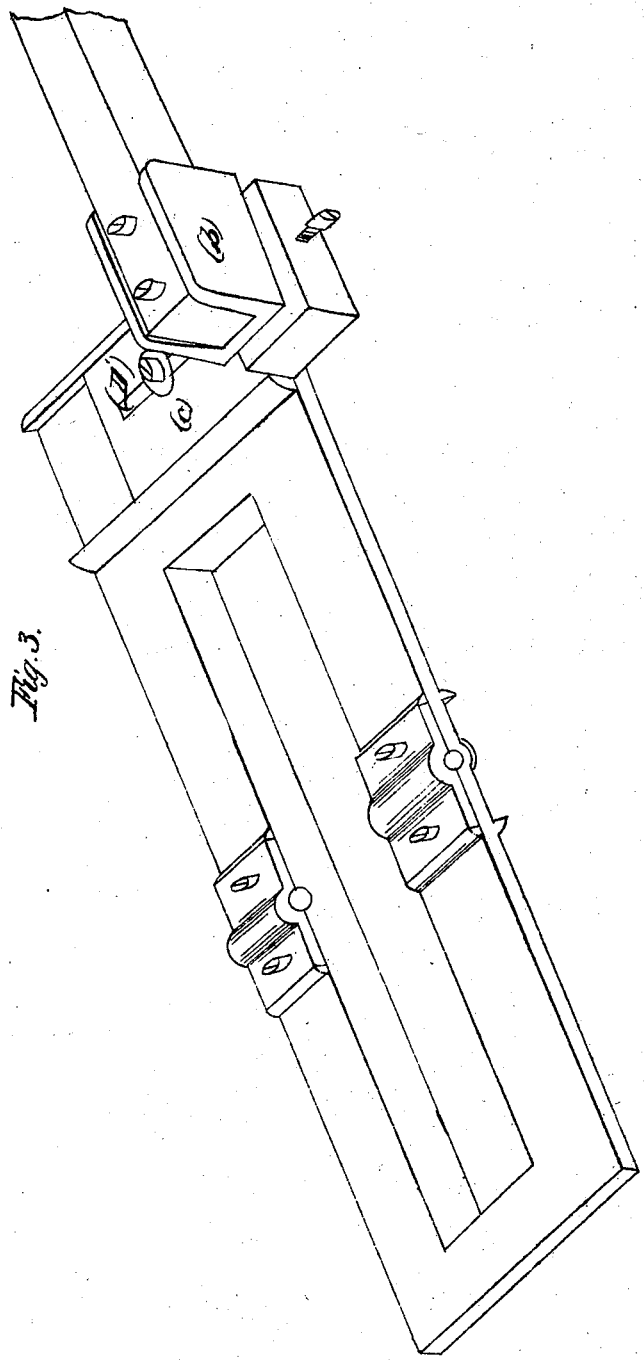

Fig. 3, Plate 1, represents the draft. $a$ is the pole, to which the team is attached in order to draw the machine. One end of said pole is connected with the machine by being fastened to draft-box $b$, by which it can be raised or lowered by the end of said box $b$ passing through the slide $c$, which supports it, and is secured to it by the screw $e$. The slide $c$, which supports the draft-box $b$, in which the pole $a$ is fastened, is made to slide on the end of the frame which supports the wheel, &c., in the reverse direction to that of the box $b$, and secured to the frame by the screw D. By this simple arrangement the pole $a$ can be raised or lowered by the draft-box and firmly secured by the screw $e$, as described; and if the draft is required to be farther in or out from the standing grass or grain it is easily arranged by the slide *e* and secured by the screw D to the frame. It is all important to a grass or grain cutting machine, and particularly to a machine which will cut both grass and grain, as the draft can be regulated to suit either, as described. Said draft can be made of cast or wrought iron.

P, Plate 2, is an apron hung from the frame of the machine, in order to protect the wheel from the grain when raked from the platform.

I do not claim to be the inventor of the turning alternating rake and slotted double platform; but What I do claim is—

1. The combination of the levers B, J, K, and A‴, connecting-rod L, and spring F, Figs. 1 and 4, with the double platform and rake D″, Fig. 1, for the purpose of alternating and turning the latter, as herein described.

2. I do not claim to be the inventor of a tight case for the back of the blade to run in, nor of slotted teeth to protect its edge; but what I do claim is: making a toothed blade-case in uniform sections *c*, Fig. 2, each section having a tooth cast in one piece with it, the whole being attached to the rack bar *a*, Fig. 2, by screws or otherwise, in such a manner that if the tooth or case of any section should get broken it may readily be replaced by an extra one cast from the same pattern and kept on hand for that purpose, the rack thus made being equally efficient to protect the stock from dirt and obstructions with the solid case, and capable of being more easily and cheaply repaired.

3. The manner in which the position of the point of draft is changed by means of the slides *b* and *c*, Figs. 3 and 4, and clamp-screws D′ and *e*, Fig. 3, as herein set forth.

FRANCIS S. PEASE.

Witnesses:
JAMES G. DICKIE,
JOHN B. WILBUR.